United States Patent [19]

Mayo

[11] 3,721,307
[45] March 20, 1973

[54] DRILL BIT BEARINGS
[75] Inventor: Terry H. Mayo, Houston, Tex.
[73] Assignee: G. W. Murphy Industries, Inc., Houston, Tex.
[22] Filed: April 27, 1971
[21] Appl. No.: 137,875

[52] U.S. Cl..................................175/372, 308/8.2
[51] Int. Cl. ................................................E21b 9/02
[58] Field of Search ........75/153; 175/371, 372, 227, 175/228, 229; 308/8.2, DIG. 4

[56] References Cited

UNITED STATES PATENTS 3,480,341  11/1969  Hickernell........................175/372 X
3,056,637  10/1962  Shanley et al. ...................308/DIG. 4
2,104,819  1/1938  Schlumpf et al.......................308/8.2

OTHER PUBLICATIONS

M. J. Donahie, The Role of Berylium Copper as an Engineering Material, 9/13/44, Page 4
J. T. Richards, Berylium–Copper Useful for Large Machine Parts, (Seam Welder Wheel Bushings)

Primary Examiner—Marvin A. Champion
Assistant Examiner—Jack E. Ebel
Attorney—C. M. Kucera

[57] ABSTRACT

A drill bit bearing including a floating beryllium copper bushing.

3 Claims, 3 Drawing Figures

PATENTED MAR 20 1973  3,721,307

Terry H. Mayo
INVENTOR.

BY C. M. Kucera

ATTORNEY

DRILL BIT BEARINGS

BACKGROUND OF THE INVENTION

This invention relates to improved bearings of large load capacity for roller drill bits.

Prior drill bit friction bearings have been subject to galling or breaking up which results in relatively short bearing life.

SUMMARY OF THE INVENTION

This invention is concerned with a new and improved friction bearing for drill bits which includes a floating bushing comprising essentially beryllium copper which provides a large load capacity bearing and one having a low coefficient of friction so that the bearing is not likely to gall or break up during the drilling operation.

While described here in connection with earth drilling bits of the rolling cutter type, it is to be understood that the bearing of the present invention can be used in other machinery employing relatively rotatable members.

DESCRIPTION OF THE PREFERRED EMBODIMENT

Figure 1:
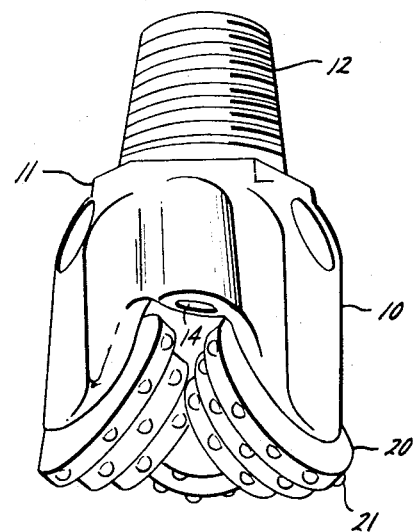
FIG. 1 is a side elevation view of a roller cutter drill bit.
Figure 2:
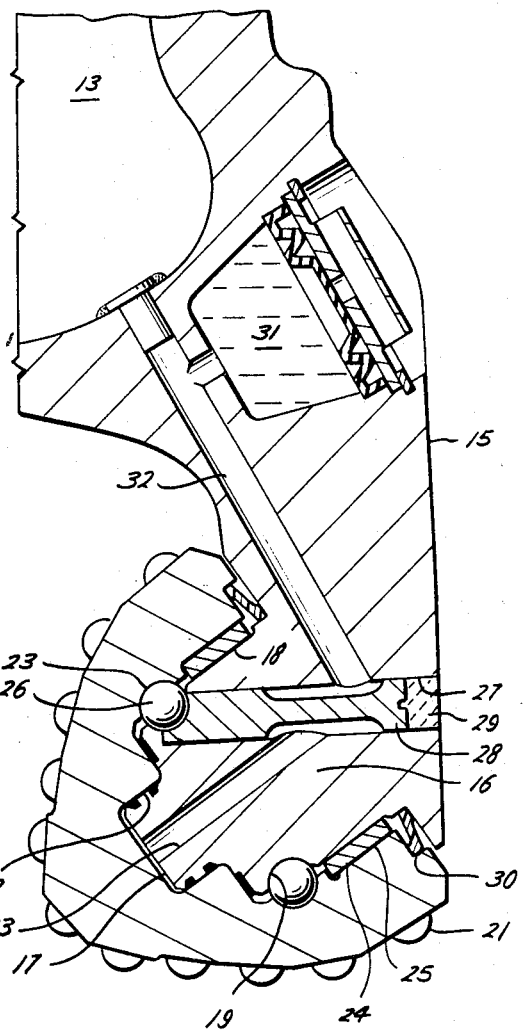
FIG. 2 is a partial detailed sectional view of the drill bit showing the bearing structure of the present invention.
Figure 3:
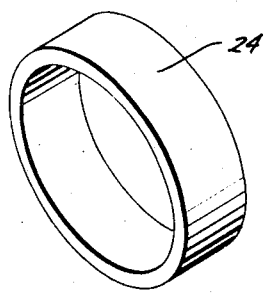
FIG. 3 is a perspective view of the bearing member removed from its position on the shaft.

Referring to FIGS. 1 and 2, an earth boring drill is shown generally at 10 comprising a steel head 11 having a threaded shank 12 extending upwardly and adapted to be secured to the lower end of a drill string (not shown). The head 11 has a chamber 13 and a nozzle 14 to receive and discharge drilling fluid pumped downwardly through the drill string in the usual manner. A plurality of steel legs 15 depend from head 11 and each terminates in an inwardly and downwardly extending shaft 16. A bearing pin 17 is provided on the inner end of the shaft 16. A cylindrical portion 18 is provided on the shaft 16 outwardly from the pin 17. A ball race 19 is located on the shaft 16 between the pin 17 and the cylindrical portion 18.

A steel cutter 20, having cutting elements 21 such as tungsten carbide inserts, surrounds the shaft 16, and has a friction race 22 engaging the pin 17 and a ball race 23 which is complementary to the race 19 on the shaft 16. A bearing 24 is positioned on the cylindrical portion 18. The cutter 20 has a friction race 25 disposed over the bearing 24.

Ball bearings 26 are inserted into the ball races 19 and 23 through bore 27 in the shaft 16 and a ball retaining plug 28 is secured in the bore 27 by welding as shown at 29. A grease seal 30 is provided between the outer end of the cutter 20 and the shaft 16.

Lubrication is supplied to the interior of the cutter 20 from the reservoir 31, through passage 32, around plug 28 and through passage 33 in the shaft.

The bearing 24 consists mainly of beryllium, copper, cobalt and nickel and is shown as a cylindrical bushing fitting between the cylindrical portion 18 of the shaft 16 and the friction race 25 of the cutter 20. The bearing 24 floats between the cylindrical portion 18 and the cutter race 25. There is a diametral clearance between he outside diameter of the cylindrical portion 18 and the inside diameter of the bearing 24 of from two thousandths to fourteen thousandths of an inch, and a diametral clearance of from two thousandths to fourteen thousandths of an inch between the outside diameter of the bearing 24 and the inside diameter of the cutter race 25. The bearing 24 is thus free to rotate with respect to the shaft or cutter as just described, without seizing or galling for long periods of time under high loads when properly lubricated and sealed as shown in the preferred embodiment.

The bearing bushing 24 may contain a beryllium content of more than 0.25 percent and less than 3 percent but preferably consists of 1.80 to 2.05 percent. The bearing bushing consists mainly of copper alloyed with appreciable amounts of beryllium with lesser amounts of cobalt, nickel and iron. For example, the cobalt content may be from 0.20 to 0.30 percent and the cobalt and nickel may be 0.20 percent minimum and the cobalt, nickel and iron may be 0.6 percent maximum. Such material may have a modulus of elasticity of approximately 18,500,000 and may be solution annealed and age hardened to a tensile strength of 165,000 to 190,000 PSI having a Rockwell C hardness of from 36 to 41.

I have found the bearing bushing 24 may have a thickness of between 0.100 and 0.280 inches but a thickness of approximately 0.150 inches, functions successfully as a free turning bushing under high loads (up to 25,000 pounds per bushing) due in part, I believe, to the low modulus of elasticity of the bushing which permits it to more nearly continuously conform to the opposing bearing surfaces at a relatively low load value; to the good flexure characteristic of the bushing which permits it to more nearly continuously conform to the opposing bearing surfaces without failing due to fatigue to a low coefficient of friction of the bushing when highly loaded against materials as hard or harder than the beryllium copper bushing, such as the steel shaft 16 and cutter 20, and to the hardness of the bushing material which is sufficient to resist wear and extrusion.

The improvement of the roller drill bit of this invention over that of the prior art resides in the bearing bushing construction (having diametrical clearances between the bearing shaft and the bushing and between the bushing and the cutter race of approximately two thousandths to fourteen thousandths of an inch and consisting of a beryllium copper alloy of the composition previously set forth), said bushing bearing being adapted to withstand loads of over 10,000 PSI during a drilling operation.

What is claimed is:

1. A roller drill bit including;
a head,
a leg depending from said head,
a bearing shaft on said leg,
said shaft having a ball bearing race,
a reduced pin portion on said shaft inboard of said ball race,
a cylindrical friction race portion on said shaft outboard of said ball race,
a bearing bushing on said cylindrical friction race, a roller cutter having ball and friction races adapted to rotate about said shaft, ball bearings in said ball races, lubricant in the interior of said cutter, a lubricant seal between the outer end of the cutter and the shaft, the said bearing bushing consisting mainly of copper alloyed with an appreciable amount of beryllium and lesser amounts of cobalt, nickel and iron, the bearing bushing being rotatable relative to said shaft and said cutter and having diametral clearances between said shaft and bushing and said bushing and cutter of approximately two thousandths to fourteen thousandths of an inch, said bearing bushing during a drilling operation being adapted to withstand loads in excess of 10,000 PSI.

2. A roller bit according to claim 1 wherein:

the thickness of the said bearing bushing is between 0.100 and 0.280 inches.

3. A rock bit according to claim 1 wherein:

the said bushing beryllium content is more than 0.25 percent and less than 3 percent.

* * * * *